United States Patent
Scalf et al.

(10) Patent No.: US 10,563,903 B2
(45) Date of Patent: Feb. 18, 2020

(54) APPLIANCE WITH TRANSITIONING DOOR HANDLES

(71) Applicant: Midea Group Co., Ltd., Beijiao, Shunde, Foshan (CN)

(72) Inventors: Eric Scalf, Louisville, KY (US); Phillip C. Hombroek, Louisville, KY (US)

(73) Assignee: MIDEA GROUP CO., LTD., Beijiao, Shunde, Foshan, Guangdong (CN)

( * ) Notice: Subject to any disclaimer, the term of this patent is extended or adjusted under 35 U.S.C. 154(b) by 73 days.

(21) Appl. No.: 15/843,880

(22) Filed: Dec. 15, 2017

(65) Prior Publication Data

US 2019/0186809 A1 Jun. 20, 2019

(51) Int. Cl.
*F25D 23/02* (2006.01)
*A47J 37/06* (2006.01)
(Continued)

(52) U.S. Cl.
CPC ........ *F25D 23/028* (2013.01); *A47J 37/0664* (2013.01); *A47L 15/4257* (2013.01);
(Continued)

(58) Field of Classification Search
CPC ............... F25D 23/028; F25D 2700/04; F25D 2323/021; E05B 5/006; E05B 2001/0023; E05B 5/003; E05B 1/0038; E05B 1/0015; E05B 1/0046; E05B 2001/0076; E05B 7/00; E05B 5/00; E05B 1/0053; E05B 17/0025; E05B 17/0029; E05B 17/0033; E05F 15/63; E05F 15/75; E05Y 2201/426;
(Continued)

(56) References Cited

U.S. PATENT DOCUMENTS 4,707,006 A * 11/1987 Garg ......................... E05C 9/00
292/336.3
6,089,625 A * 7/2000 Prevot ................... E05B 65/087
292/140
(Continued)

FOREIGN PATENT DOCUMENTS

CN 102269508 A 12/2011
CN 103486808 A 1/2014
(Continued)

OTHER PUBLICATIONS

Machine english translation for CN102269508, (Year: 2011).*
International Search Report and Written Opinion issued in Application No. PCT/CN2018/074176 dated Aug. 17, 2018.

*Primary Examiner* — Hiwot E Tefera
(74) *Attorney, Agent, or Firm* — Middleton Reutlinger

(57) ABSTRACT

An appliance, e.g., a refrigerator, and method utilize a transitioning handle that is usable in both a recessed and an extended position. As an example, a refrigerator may include a housing that defines at least a food compartment, a door attached to the housing that provides access to the food compartment and includes an exterior surface and a handle recess extending inwardly from the exterior surface of the door, and a handle attached to the at least one door and movably mounted within the handle recess between a recessed position and an extended position, where the handle is manually grippable in both the recessed position and the extended position.

19 Claims, 7 Drawing Sheets

(51) Int. Cl.
*A47L 15/42* (2006.01)
*D06F 39/14* (2006.01)
*F24C 15/02* (2006.01)

(52) U.S. Cl.
CPC ............ *D06F 39/14* (2013.01); *F24C 15/024* (2013.01); *F25D 2323/021* (2013.01); *F25D 2700/04* (2013.01)

(58) Field of Classification Search
CPC .... F24C 15/024; Y10T 16/458; Y10T 292/57; A47B 95/02; A47B 2095/021; A47B 2095/023; A47B 2095/022; A47B 2095/026; A47B 2095/027; Y10S 292/31; D06F 39/14; A47L 15/4257; A47J 37/0664
USPC ....... 16/412, 430; 312/405, 291, 292, 332.1, 312/348.6; 292/336.3, DIG. 31; 49/460, 49/278
See application file for complete search history.

(56) References Cited

U.S. PATENT DOCUMENTS

| | | | | |
|---|---|---|---|---|
| 6,655,765 B2 * | 12/2003 | Kawamura | ............ | E05B 1/0015 312/296 |
| 6,802,155 B1 * | 10/2004 | Kawabata | ............ | E05B 17/0025 49/192 |
| 8,297,725 B2 | 10/2012 | Kim et al. | | |
| 8,496,277 B2 * | 7/2013 | Commons | ............. | E05B 1/0092 292/336.3 |
| 8,668,289 B2 | 3/2014 | Lee et al. | | |
| 8,701,428 B2 | 4/2014 | Lee et al. | | |
| 9,297,572 B2 * | 3/2016 | Bischoff | ............... | F25D 23/028 |
| 9,506,685 B2 * | 11/2016 | Park | ........................ | F25D 23/00 |
| 2006/0107597 A1 | 5/2006 | Jin et al. | | |
| 2008/0282504 A1 * | 11/2008 | Baumeister | ............... | E05B 7/00 16/412 |
| 2010/0101267 A1 * | 4/2010 | Jung | .................... | F25D 23/028 62/449 |
| 2012/0205925 A1 * | 8/2012 | Muller | .................... | E05B 77/04 292/336.3 |
| 2012/0298095 A1 * | 11/2012 | Saporetti | ............... | F24C 15/024 126/192 |
| 2013/0113357 A1 | 5/2013 | Park et al. | | |
| 2013/0127185 A1 * | 5/2013 | Lang | ...................... | E05B 81/77 292/336.3 |
| 2013/0270990 A1 * | 10/2013 | Park | ...................... | F25D 23/028 312/404 |
| 2013/0340465 A1 * | 12/2013 | Park | ........................ | F25D 11/00 62/376 |
| 2014/0265805 A1 | 9/2014 | Chamberlin | | |
| 2014/0354134 A1 * | 12/2014 | Park | ...................... | F25D 23/028 312/404 |
| 2015/0233154 A1 * | 8/2015 | Smart | ..................... | E05B 81/28 70/237 |
| 2015/0241116 A1 * | 8/2015 | Choi | ................... | E05B 65/0042 312/404 |

FOREIGN PATENT DOCUMENTS

| | | |
|---|---|---|
| CN | 206207872 U | 5/2017 |
| DE | 202004018297 U1 | 4/2006 |
| DE | 102009035768 A1 | 4/2010 |
| JP | 2005299314 A | 10/2005 |
| KR | 20030083320 A | 10/2003 |
| KR | 20080105220 A | 12/2008 |
| KR | 101871716 A | 10/2010 |
| KR | 20110059995 A | 6/2011 |

* cited by examiner

APPLIANCE WITH TRANSITIONING DOOR HANDLES

BACKGROUND

Appliances such as refrigerators conventionally have one of two types of handles. The first type of conventional handle is the more traditional grasp handle that is connected to the front surface of an appliance, and extends outwardly beyond the front surface of the appliance. This outward extension provides an area where a user can grasp the handle to open. The second type of conventional handle is a pocket handle, which provides a recess into which a user inserts a hand in order to pull and open the door.

With respect to grasp handles, a refrigerator door may be constructed with a flat or contoured exterior surface, and then a handle with matching surfaces may be screwed in place. A hidden stud may be used to secure the handle via a set-screw. However, because these handles extend from the door they are susceptible to aesthetic damages (e.g. dings, dents, scratches, or the like). Typically, this type of handle could impact a counter surface, wall, or the like, potentially causing damage. Furthermore, as refrigerators grow in size, these handles may have to be removed whenever moving a refrigerator in order to fit the refrigerator through most standard residential doorways.

With respect to pocket handles, a handle may typically be formed into a plastic endcap of a door, such that after the door is constructed and foamed, a user has a recessed area to grab and pull to open the door. However, unlike a grasp handle, these handles typically require a door to forego foam insulation, which may require alteration of the overall design, and may also result in changes to the thermal performance of the door.

Some consumers may also prefer the look and/or the operation of one type of handle over another. However, other features more often drive consumer purchasing decisions, so consumers that prefer a refrigerator having one type of handle may opt for another refrigerator having the other type of handle, but having a feature set that otherwise is more to the consumer's liking.

Accordingly, there is a need in the art to minimize the limitations of each the grasp handle and the pocket handle, while simultaneously being able to utilize the advantages of each.

SUMMARY

The herein-described embodiments address these and other problems associated with the art by providing an appliance, for example a refrigerator, and method that utilize transitioning door handles. In one aspect, a refrigerator appliance consistent with embodiments described herein includes: a housing defining at least a food compartment; a door attached to the housing and providing access to the food compartment, the door including an exterior surface and a handle recess extending inwardly from the exterior surface of the door; and a handle attached to the at least one door and movably mounted within the handle recess between a recessed position and an extended position, and where the handle is manually grippable in both the recessed position and the extended position.

In some embodiments, the handle recess is sized and configured to provide access to an inwardly facing surface of the handle to facilitate manual gripping of the handle when in the recessed position. In other embodiments, the refrigerator appliance further includes a controller and a handle drive system coupled to the controller to transition the handle between the recessed position and the extended position. In still other embodiments, the refrigerator appliance further includes a proximity sensor coupled to the controller and configured to sense user presence.

In some embodiments, the controller is configured to, based on a proximity signal from the proximity sensor, transition the handle to the extended position. In other embodiments, the controller is configured to, based on a proximity signal from the proximity sensor, transition the handle to the recessed position. In still other embodiments, controller is configured to, based on a user-defined setting, adjust a speed of transition between the recessed position and the extended position. In still yet other embodiments, the controller is configured to, based on a user-activated switch, fix the handle in either the recessed position or the extended position.

In some embodiments, the handle drive system includes a motor. In other embodiments, the handle drive system includes a solenoid. In still other embodiments, the handle drive system further includes a stop that inhibits movement of the handle beyond the extended position.

In some embodiments, the handle is slidably attached to the door such that movement between the recessed position and the extended position is a linear movement. In other embodiments, the handle is pivotably attached to the door such that movement between the recessed position and extended position is a pivot movement. In still other embodiments, the handle is attached to the door such that movement between the recessed position and the extended position is a combination of a linear movement and a pivot movement.

In some embodiments, the handle includes an elongated member supported by one or more transverse support structures that recess into the handle recess. In some embodiments, the elongated member is substantially vertically oriented. In other embodiments, the elongated member is substantially horizontally oriented.

In another aspect, a refrigerator appliance consistent with some embodiments described herein includes: a housing defining at least a food compartment; a door attached to the housing and providing access to the food compartment, the door including an exterior surface and a handle recess extending inwardly from the exterior surface of the door; a handle attached to the at least one door and movably mounted within the handle recess for movement between a recessed position and an extended position, where the handle is manually grippable for the purpose of opening the door in both the recessed position and the extended position; a handle drive system configured to transition the handle between the recessed position and the extended position; a proximity sensor that generates a proximity signal; and a controller that is configured to, based on the proximity signal, signal the handle drive system to transition the handle between the recessed position and the extended position.

In still another aspect, an embodiment of a method of opening a refrigerator appliance is disclosed herein, where the refrigerator appliance includes a housing defining at least a food compartment, at least one door attached to the housing, and a handle attached to the at least one door and movable between a recessed position and an extended position, where the handle is operable in both the recessed position and the extended position, the method including: receiving, by a controller, a proximity signal; transitioning, based on a signal from the controller, the handle between the recessed position and the extended position.

In some embodiments, the method further includes adjusting, by the controller, a speed of transition between the recessed position and the extended position.

In still yet another aspect, an embodiment of a household appliance is disclosed herein, the household appliance including: a housing defining at least one compartment of the appliance; a door attached to the housing and providing access to the at least one compartment, the door including an exterior surface and a handle recess extending inwardly from the exterior surface of the door; and a handle attached to the at least one door and movably mounted within the handle recess between a recessed position and an extended position, and where the handle is manually grippable in both the recessed position and the extended position.

In some embodiments, the appliance is a washing machine, a dryer, a dishwasher, an oven, a toaster oven, or a microwave oven.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
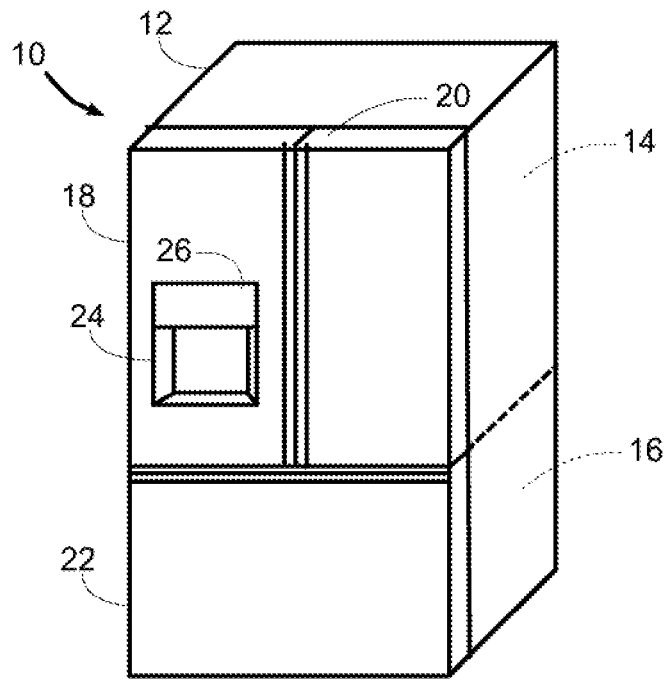
FIG. 1 is a perspective view of a refrigerator consistent with some embodiments of the invention.

Turning now to the drawings, wherein like numbers denote like parts throughout the several views, FIG. 1 illustrates all example appliance, e.g., a refrigerator 10, in which the various technologies and techniques described herein may be implemented. Refrigerator 10 is a residential-type or household refrigerator, and as such includes a cabinet or case 12, a fresh food compartment 14, a freezer compartment 16, one or more fresh food compartment doors 18, 20 and one or more freezer compartment doors 22.

Fresh food compartment 14 is generally maintained at a temperature above freezing for storing fresh food such as produce, drinks, eggs, condiments, lunchmeat, cheese, etc. Various shelves, drawers, and/or sub-compartments may be provided within fresh food compartment 14 for organizing foods, and it will be appreciated that some refrigerator designs may incorporate multiple fresh food compartments and/or zones that are maintained at different temperatures and/or at different humidity levels to optimize environmental conditions for different types of foods. Freezer compartment 16 is generally maintained at a temperature below freezing for longer-term storage of frozen foods, and may also include various shelves, drawers, and/or sub-compartments for organizing foods therein.

Refrigerator 10 as illustrated in FIG. 1 is a type of bottom mount refrigerator commonly referred to as a French door refrigerator, and includes a pair of side-by-side fresh food compartment doors 18, 20 that are hinged along the left and right sides of the refrigerator to provide a wide opening for accessing the fresh food compartment, as well as a single sliding freezer compartment door 22 that is similar to a drawer and that pulls out to provide access to items in the freezer compartment. It will be appreciated, however, that other door designs may be used in other embodiments, including various combinations and numbers of hinged and/or sliding doors for each of the fresh food and freezer compartments. Moreover, while refrigerator 10 is a bottom mount refrigerator with freezer compartment 16 disposed below fresh food compartment 14, the invention is not so limited, and as such, the principles and techniques may be used in connection with other types of refrigerators in other embodiments.

Refrigerator 10 may also include a door-mounted dispenser 24 for dispensing ice and/or water. In the illustrated embodiments, dispenser 24 is an ice and water dispenser capable of dispensing both ice and chilled water, while in other embodiments, dispenser 24 may be an ice only dispenser for dispensing only cubed and/or crushed ice. In still other embodiments, dispenser 24 may additionally dispense hot water, coffee, beverages, or other liquids, and may have variable, measured, and/or fast dispense capabilities. In some instances, ice and water may be dispensed from the same location, while in other instances separate locations may be provided in the dispenser for dispensing ice and water. In other embodiments, refrigerator 10 may not include a door-mounted dispenser 24 at all.

Refrigerator 10 also includes a control panel 26, which in the illustrated embodiment is integrated with dispenser 24 on door 18, and which includes various input/output controls such as buttons, indicator lights, alphanumeric displays, dot matrix displays, touch-sensitive displays, etc. for interacting with a user, in other embodiments, control panel 26 may be separate from dispenser 24 (e.g., on a different door), and in other embodiments, multiple control panels may be provided. Further, in some embodiments audio feedback may be provided to a user via one or more speakers, and in some embodiments, user input may be received via a spoken or gesture-based interface. Additional user controls may also be provided elsewhere on refrigerator 10, e.g., within fresh food and/or freezer compartments 14, 16. In addition, refrigerator 10 may be controllable remotely, e.g., via a smartphone, tablet, personal digital assistant or other networked computing device, e.g., using a web interface or a dedicated app.

Figure 2:
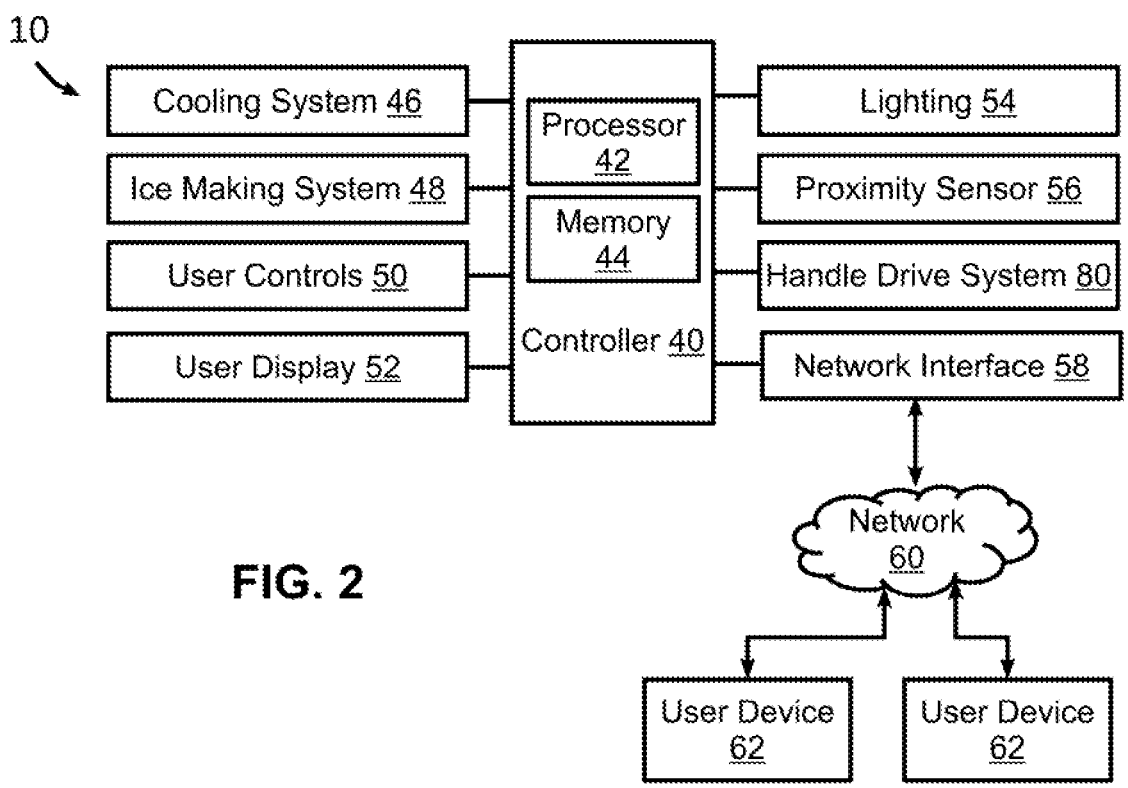
FIG. 2 is a block diagram of an example control system for the refrigerator of FIG. 1.

A refrigerator consistent with the invention also generally includes one or more controllers configured to control a refrigeration system as well as manage interaction with a user. FIG. 2, for example, illustrates an example embodiment of a refrigerator 10 including a controller 40 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 2, controller 40 may be interfaced with various components, including a cooling or refrigeration system 46, an ice making system 48, one or more user controls 50 for receiving user input (e.g., various combinations of switches, knobs, buttons, sliders, touchscreens or touch-sensitive displays, microphones or audio input devices, image capture devices, etc.), and one or more user displays 52 (including various indicators, graphical displays, textual displays, speakers, etc.), as well as various additional components suitable for use in a refrigerator, e.g., interior and/or exterior lighting 54, among others.

Controller 40 may also be interfaced with various sensors located to sense environmental conditions inside of and/or external to refrigerator 10, e.g., one or more temperature sensors, humidity sensors, proximity sensors 56, etc. Such sensors may be internal or external to refrigerator 10, and may be coupled wirelessly to controller 40 in some embodiments.

In some embodiments, controller 40 may also be coupled to one or more network interfaces 58, e.g., for interfacing with external devices via wired and/or wireless networks such as Ethernet, Wi-Fi, Bluetooth, NFC, cellular and other suitable networks, collectively represented in FIG. 2 at 60. Network 60 may incorporate in some embodiments a home automation network, and various communication protocols may be supported, including various types of home automation communication protocols. In other embodiments, other wireless protocols, e.g., Wi-Fi or Bluetooth, may be used.

In some embodiments, refrigerator 10 may be interfaced with one or more user devices 62 over network 60, e.g., computers, tablets, smart phones, wearable devices, etc., and through which refrigerator 10 may be controlled and/or refrigerator 10 may provide user feedback.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media, in addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the refrigerator illustrated in FIGS. 1 and 2 will be apparent to one of ordinary skill in the art, as will become apparent from the description below. Therefore, the invention is not limited to the specific implementations discussed herein.

Figure 3A:
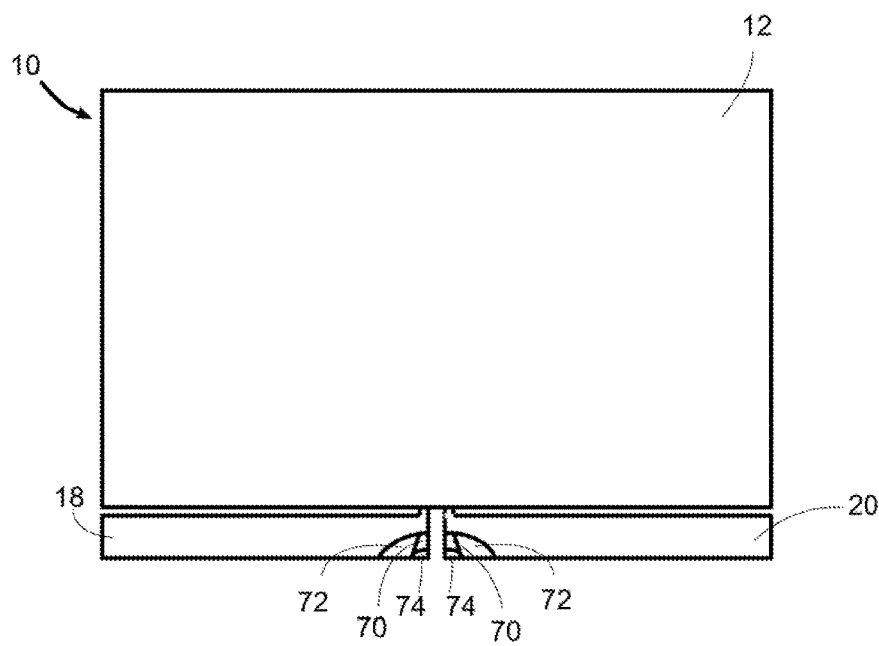
FIG. 3A is a top view of the refrigerator of FIG. 1 where the doors are closed and the handles are in a recessed position.
Figure 3B:
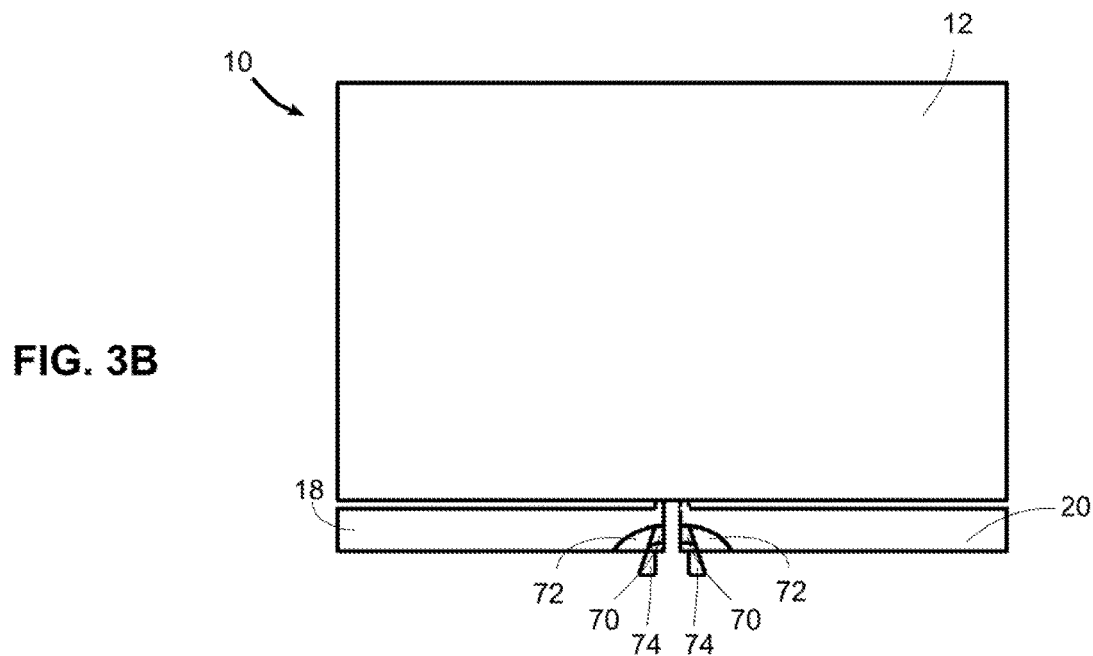
FIG. 3B is a top view of the refrigerator of FIG. 1 where the doors are closed and the handles are in an extended position.

Now turning to FIGS. 3A and 3B, embodiments consistent with the disclosure, as mentioned above, are directed in part to movable transitional door handles 70. FIG. 3A illustrates handles 70 in a recessed position, while FIG. 3B illustrates handles 70 in an extended position. Doors 18, 20 may additionally include a handle recess 72. In some embodiments, such as illustrated in FIGS. 3A and 3B, the handle recess 72 may extend inwardly from the exterior surface of the door 18, 20. In such embodiments, this handle recess 72 may be a void where a user may place their hand in order to grip an inwardly facing surface of the handle 70 in order to open the door 18, 20 when in a recessed position, as such the handle recess 72 may be of a size and depth capable of accommodating hands of varying sizes. In some embodiments, the handle recess 72 may be constructed of plastic; however, this is not so limited, as any material known in the art (e.g., metal or a composite material) may also be used to construct the handle recess 72. In other embodiments, for example when handle 70 may be on the edge of the door, the handle recess 72 may be the same size as the handle 70 itself, although it is not so limited. When in a recessed position, as illustrated in FIG. 3A, the one or more handles 70 may be retracted, or recessed, into this handle recess 72. In some embodiments, this may result in a substantially flush exterior surface of the door 18, 20, where the handle 70 does not protrude, or at most minimally protrudes, outwardly from the surface of the door 18, 20.

When in an extended position, as illustrated in FIG. 3B, at least a portion of the one or more handles 70 may extend from the exterior surface of the door 18, 20. In such a position, the handle 70 may further include an elongated member 74 and at least one transverse support structure 76 that recesses into the handle 70 (see FIG. 6). In some embodiments, the elongated member 74 may be substantially vertically oriented, such as illustrated in FIG. 3B. In other embodiments, the handle 70 and elongated member 74 may be substantially horizontally oriented. In some instance, a horizontal orientation may be desirable when the handle 70 and elongated member 74 are on a refrigerator drawer or the like. This elongated member 74 may provide a user a surface to grasp in order to manipulate the door 18, 20 while in an extended position. In some embodiments, the handle 70, including the elongated member 74 and the traverse support structure(s) 76, may be manufactured out of one or more extruded metals, formed metals, formed plastic, and/or the like. In some embodiments, the elongated member 74 may have a flat front surface (as illustrated in FIGS. 3A and 3B); while in other embodiments, the elongated member 74 may have a contoured front surface (for example, see FIG. 7). In some instances, it may be desirable for the shape and contour of the elongated member 74 to match the shape and contour of the front surface of the front surface of the refrigerator 10, for example where the front surface of the refrigerator is contoured, it may be aesthetically desirable for the elongated member 74 to also be contoured.

Unlike some conventional handle designs, where a handle may recess into a surface and may not be usable as a handle in that position, a handle 70 described herein is still usable to open the door when in the recessed position. In particular, when a handle described herein is in a recessed position, an inwardly facing surface (i.e., a surface having at least a portion thereof that faces an interior of the door) is still accessible within a handle recess to enable a user to manually grip the handle and exert a pulling force on the door to pivot or slide the door from a closed to an open position.

Figure 8A:
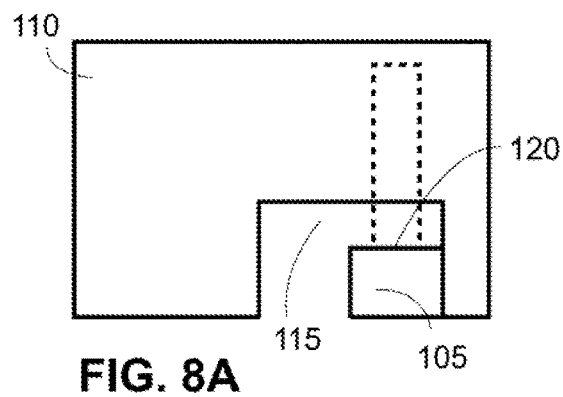
FIG. 8A-B illustrate linear movement between the recessed position (FIG. 8A) and the extended position (FIG. 8B).
Figure 8B:
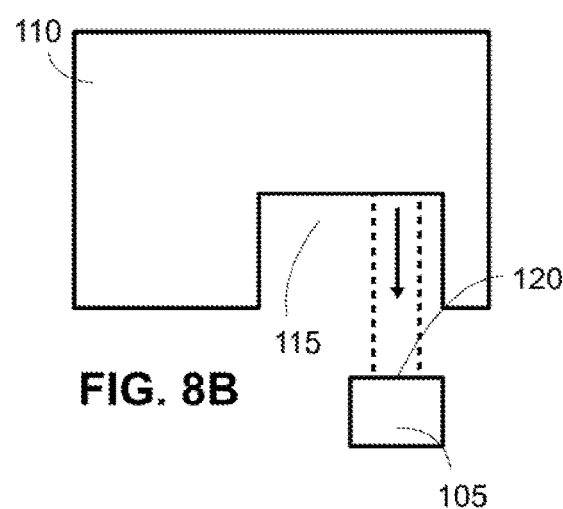

The movable handle may transition from a recessed position to an extended position through any number of possible trajectories and/or types of motion. For example, in some embodiments, such as illustrated in FIGS. 8A-B, a handle 105, and/or an elongated member thereof, may be slidably attached to the door 110, so that the movement between the recessed position and the extended position is a linear movement as represented by the arrow in FIG. 8B. The handle 105 illustrated in FIG. 8A is in a recessed position, and capable of being grasped by a user in such a state. In some instances, a user may place their hand in a handle recess 115 in order to grip an inwardly facing surface 120 of the handle 105 to open the door 110. In some instances the broken line may represent one or more traverse support structures that support the handle 105 when in an extended position (FIG. 8B), but may retracted when the handle 105 is in a recessed position (FIG. 8A). The linear movement may be generally transverse to the plane of the door in some embodiments, while in other embodiments the linear movement may be at a different angle relative thereto.

Figure 9A:
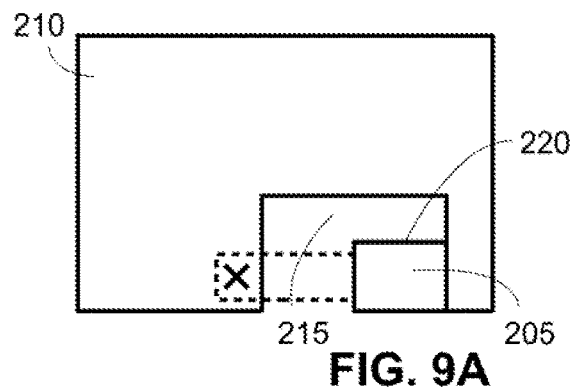
FIG. 9A-B illustrate rotational movement between the recessed position (FIG. 9A) and the extended position (FIG. 9B).
Figure 9B:
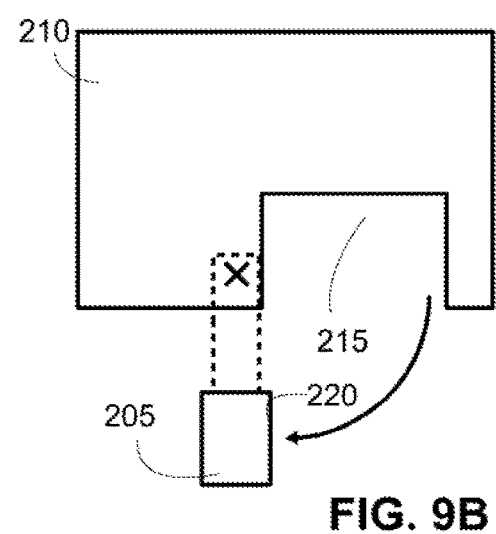

In other embodiments, such as illustrated in FIGS. 9A-B, a handle 205, and/or an elongated member thereof, may be pivotally attached to the door 210, so that the movement between the recessed position and the extended position is a pivotal or rotational movement as represented by the arrow in FIG. 96. The handle 205 illustrated in FIG. 9A is in a recessed position, and capable of being grasped by a user in such a state. In some instances, a user may place their hand in a handle recess 215 in order to grip an inwardly facing surface 220 of the handle 205 to open the door 210. In some embodiments, such as illustrated in FIGS. 9A and 9B, the inwardly facing surface 220 may reference the inwardly facing surface 220 of the handle 205 when in a recessed position; however, when in an extended position the same portion of this surface may no longer be inwardly-facing, and instead a different portion of the surface, or a different surface entirely, may be inwardly-facing as a result of the pivoting movement of the handle. In some instances the broken line may represent one or more traverse support structures that support the handle 205 when in an extended position (FIG. 9A). The "X" in FIGS. 9A and 9B represents a pivot point, about which the handle 205 may pivot (as represented by the arrow) between the recessed position (FIG. 9A) and the extended position (FIG. 9B).

Although not specifically illustrated herein, the handle may also transition between a recessed and extended position through a combination of linear and rotational movement.

Figure 4A:
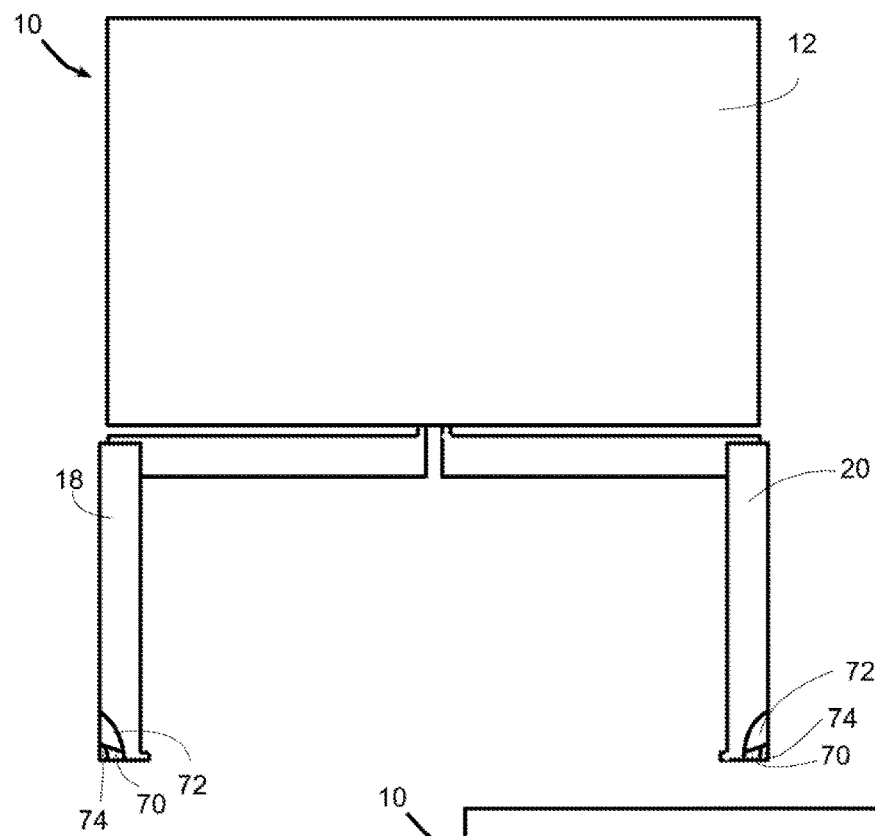
FIG. 4A is a top view of the refrigerator of FIG. 1 where the doors are open and the handles are in a recessed position.
Figure 4B:
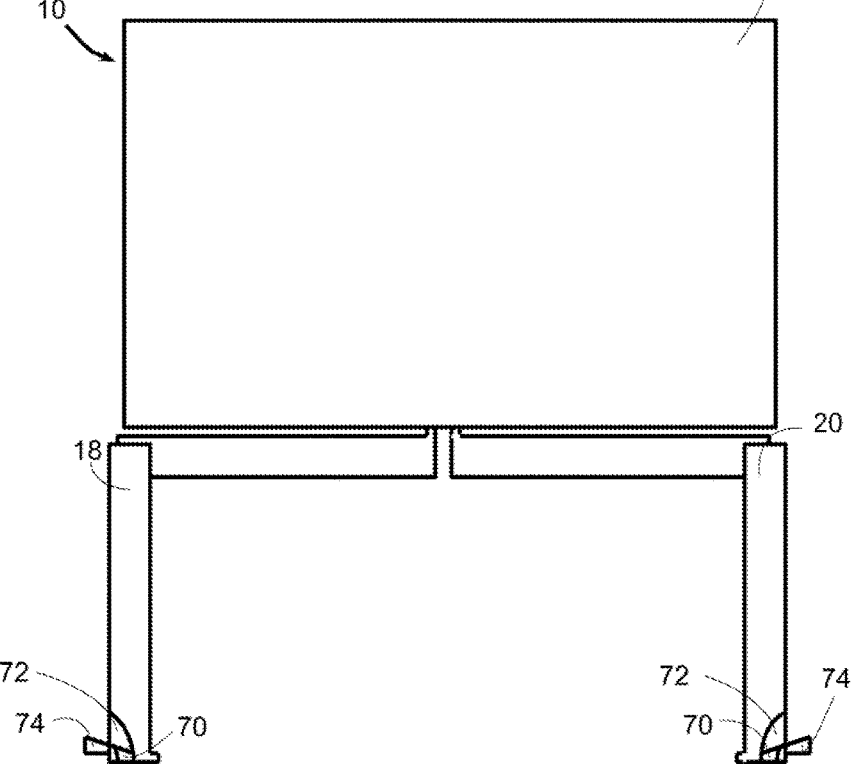
FIG. 4B a top view of the refrigerator of FIG. 1 where the doors are open and the handles are in an extended position.

Now turning to FIGS. 4A and 4B, the refrigerator 10 is illustrated with the doors 18, 20 in an open position. FIG. 4A illustrates handles 70 in a recessed position with the doors 18, 20 open, while FIG. 4B illustrates handles 70 in an extended position with the doors 18, 20 open. As illustrated in FIG. 4B, the elongated member 74 of the handle 70 may extend beyond the exterior surface of the door 18, 20 and may be supported by one or more traverse support structures 76. When handles 70 are in such an extended position, they may be susceptible to dings, dents, scratches, and the like as other items, individuals, etc. come into contact with them and may potentially cause damage. Additionally, when handles 70 are in an extended position they may be susceptible to dings, dents, scratches, and the like as the refrigerator 10 is moved for installation. Movable handles 70, may allow the handles to be placed into a recessed position when not in use or when the refrigerator 10 is being installed in order to minimize damage to handles 70.

Figure 5:
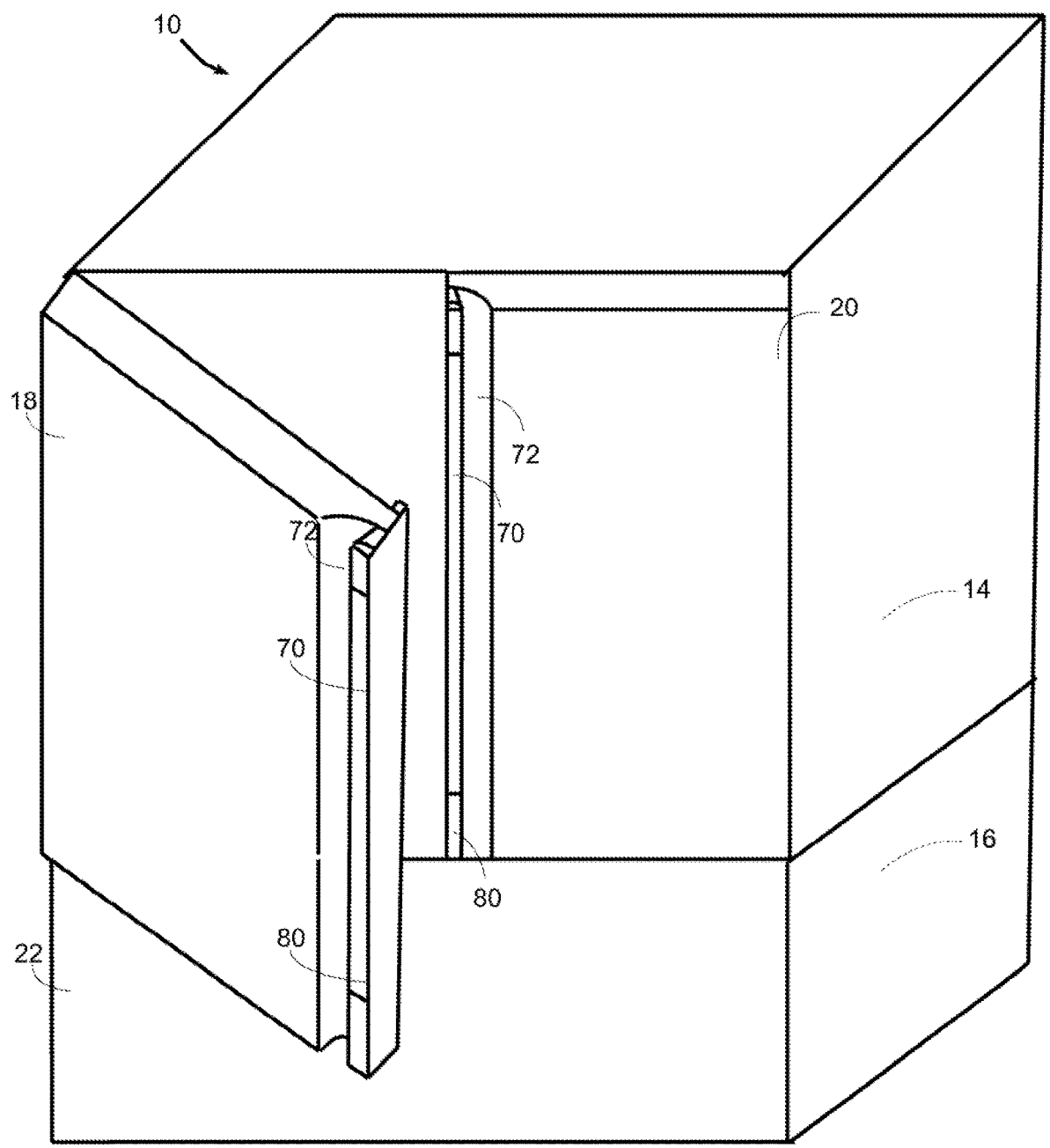
FIG. 5 is a perspective view of the refrigerator of FIG. 1 with a door open and the handle in a recessed position.
Figure 6:
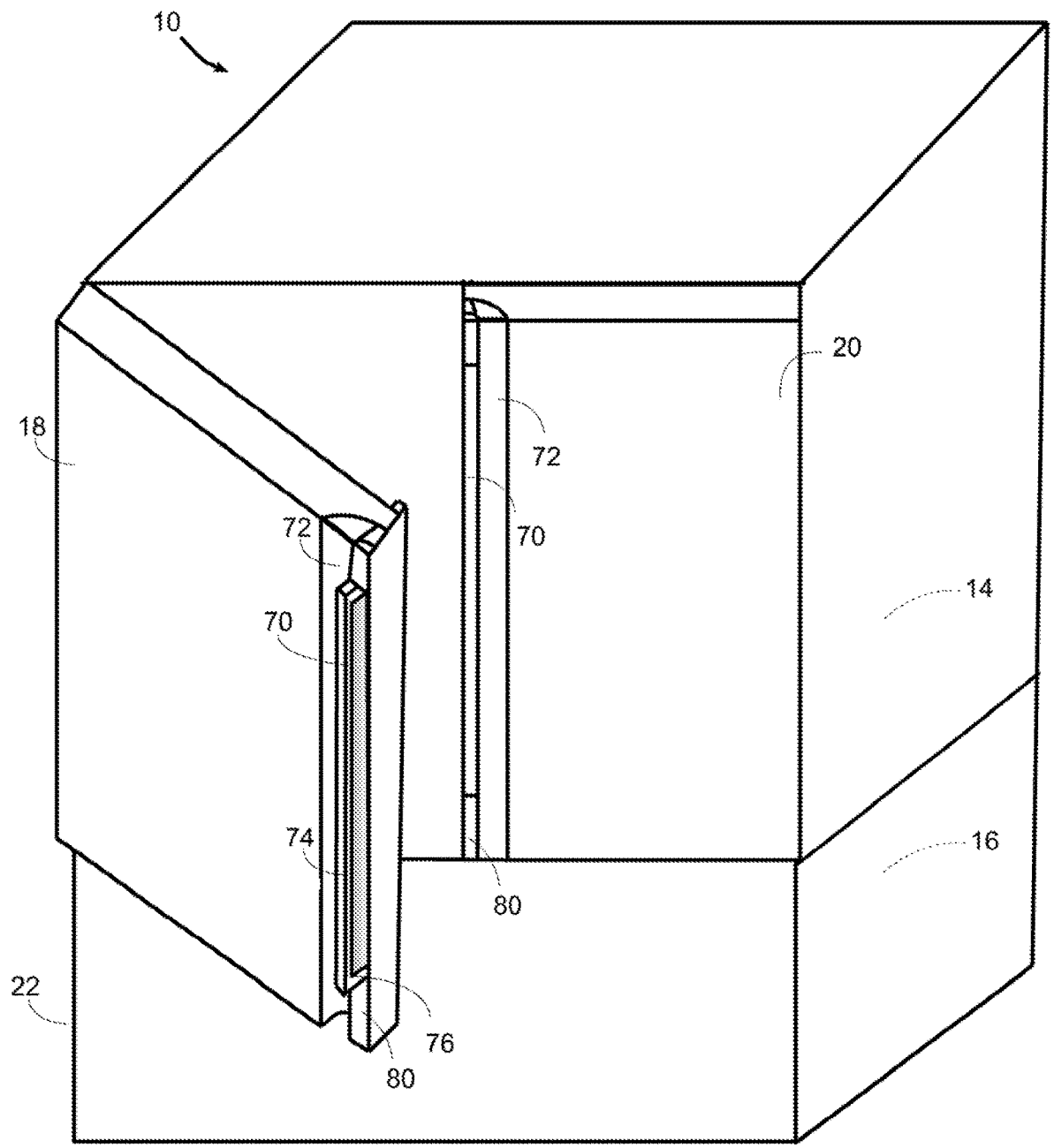
FIG. 6 is a perspective view of the refrigerator of FIG. 5 where a door is open and the handle is in an extended position.

Referring now to FIG. 5, a perspective view of an embodiment of refrigerator 10 with door 18 open and a handle 70 in a recessed position is illustrated. Either end of the handle 70, or both ends of the handle 70, may further contain a handle drive system 80 which may be coupled with the controller 40 in order to transition the handle 70 between a recessed position (FIG. 5) and an extended position (FIG. 6). In some embodiments, the handle drive system 80 includes at least one motor. In other embodiments, the handle drive system 80 includes at least one solenoid, a linear actuator, or similar device. Further, in some instances, hydraulic or pressurized air drives may be used. In addition, in some instances handle 70 may be biased to one position (e.g., by springs) and selectively driven to the other position when desired.

In some embodiments, for example where the handle drive system is only present at one end of the handle 70, a transmission system may be used to extend the motion from the handle drive system 80 located at a first end of the handle 70 to a second end of the handle. In some embodiments, the transmission system may be a simple metal bar or rod, but is not so limited. In other embodiments, the transmission system may include one or more gears, which may vary in number and size depending on size constraints, and/or a gearbox which may be utilized in order to slow the speed of the motion. Slowing the speed of motion may be particularly desirable where the handle drive system 80 includes a higher speed motor. In some embodiments, the transmission system may be concealed within a pocket or opening carved out of the door 18, 20; however, this is not intended to be limiting.

In other embodiments, a handle drive system 80 may be present at both ends of the handle 70. In such embodiments, for example where the handle drive system 80 includes two motors, one at the first end and one at the second end of the handle 70, the motors may be utilized for transitioning the handle 70 between a recessed position and an extended position. In such instances, the two motors (one at each of the first and second end) may require synchronization, in order to prevent or minimize the handle 70 from entering a torsional state, for example where the first end of the handle 70 is transitioned a different distance or speed than the second end of the handle 70. Regardless of whether the handle drive system 80 is present at only a single end of the handle 70 or present at both ends of the handle 70, the controller 40 may be, in some instances, configured to adjust a speed of transition between the recessed position and the extended position based on input from a user.

Since the handle may be grasped and used by a user while in a recessed position, such as illustrated in FIG. 5, the transmission system (e.g. motor) in some instances may have a positive stop, so that once the handle 70 is grasped by a user the handle 70 may remain in place until such a time as the handle drive system 80 receives a signal from the control 40 to transition the handle 70 to a different position. In other instances, the handle drive system 80 may also include a stop that inhibits hyperextension of the handle, or movement of the handle 70 beyond the extended position.

The mechanism and path of transitioning a handle from a recessed position may include any number of possible mechanisms and configurations. In some embodiments, the opposing ends of the handle (e.g. the top and bottom, right and left sides, etc.) may move independently of each other. For example, a top end of a handle may comprise a hinge, but stay recessed, while a bottom end of a handle may include a transverse support structure that moves linearly and/or rotationally to transition the bottom end of the handle from a recessed position to an extended position (or vice versa), thus creating a triangle-shaped configuration of the handle. In other embodiments, a handle may comprise a plurality of elongated member segments, each of which may move independent of the other(s). For example, a handle may comprise three segments, a first end segment, a middle segment, and a second end segment. In such an embodiment, the opposing end segments of the handle may remain recessed while the middle segment may transition into an extended position, including in a bended or curved configuration, although this is not intended to be limiting. In still other embodiments, greater or fewer than two transverse support structures may be used. For example, in one example embodiment, a single transverse member may be coupled to an end location (forming an "L"-shaped handle) or an intermediate location (forming a "T"-shaped handle) on an elongated member, and may be movable linearly and/or rotationally between recessed and extended positions.

Referring now to FIG. 6, where a perspective view of an embodiment of refrigerator 10 with door 18 open and a handle 70 in an extended position is illustrated in FIG. 6. In some instances it may be desirable to conceal the handle drive system 80. Illustrated in FIG. 6 an exemplary embodiment of this concealment. For example, limiting the length of the handle 70 may allow additional space at either end of the handle for the handle drive system 80. In some embodiments, this additional remaining space may be approximately 2 to 5 inches; however, this is not intended to be limiting as this space may be smaller or larger than 2 to 5 inches. It is within this space that a motor, solenoid, or the like may be enclosed, and coupled with the controller 40. In some embodiments, a cover (e.g. a plastic cover) may be placed over the area to prevent exposure of the mechanical elements.

As mentioned above, in some embodiments, refrigerator 10 may further include one or more sensors. In some embodiments, refrigerator 10 includes a proximity sensor 56 coupled to the controller 40 and configured to sense the presence of a user. In some embodiments, the proximity sensor 56 may sense movement of an individual near the refrigerator 10. In other embodiments, the proximity sensor 56 may use heat signals to determine presence and proximity of a user. However, these are not to be understood as limiting, as a person of skill in the art may recognize additional ways a proximity sensor may be able to detect the presence and location of a user, e.g., through capacitive touch sensors coupled to the refrigerator or handle. In some embodiments, the controller 40 may be configured to, based on a signal from the proximity sensor 56, transition the handle 70 to the extended position. In other embodiments, the controller 40 may be configured to, based on a signal from the proximity sensor 56, transition the handle 70 to the recessed position. In still other embodiments, the controller 40 may be configured to, based on an absence of a signal from the proximity sensor 56 within a defined period of time, transition the handle 70 to the recessed position, for example this may be desirable where the proximity sensor 56 includes a motion detector.

In some instances, it may be desirable to fix a handle 70 in a particular position (e.g. recessed or extended). For example, some users may prefer handles in one position over the other rather than handles that automatically transition. Therefore, in some embodiments, the refrigerator 10 may further include a user-activated switch for fixing handle position. Based on this user-activated switch the controller 40 may maintain the handle 70 in the desired position. Other alternatives, e.g., the use of a switch or button to select between the recessed and extended positions, a user setting selected through a control panel or mobile app, etc. may also be used. In addition, in some embodiments a handle may be manually manipulatable, e.g. without a power drive, to enable a user to manually position the handle in a recessed or extended position.

Figure 7:
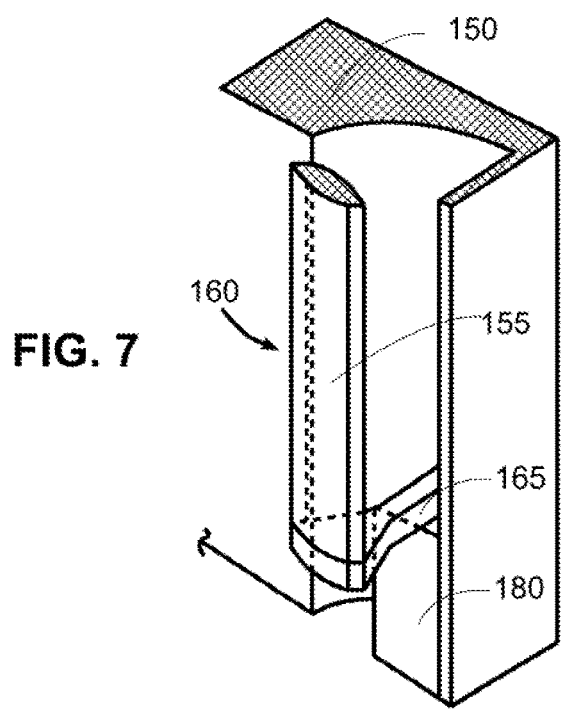
FIG. 7 is a partial perspective view of a refrigerator consistent with some embodiments of the invention illustrating a handle drive system.

Referring now to FIG. 7, which illustrates a partial perspective view of a refrigerator door 150 consistent with some embodiments described herein. An elongated member 155 of the handle 160 is illustrated in an extended position. In the embodiment illustrated in FIG. 7 the elongated member 155 has a curved shape; however, as discussed previously herein, this is not to be understood as limiting. The handle 160 further includes a traverse support structure 165 that recesses into the door 150. Although the elongated member 155 is illustrated as substantially vertically oriented in FIG. 7, this is not to be understood as limiting. In other embodiments, an elongated member may be substantially horizontally oriented, for example in a drawer configuration. FIG. 7 further illustrates an embodiment of a handle drive assembly 180; as illustrated, the handle 160 length is limited allowing additional space at the end of the elongated member 155 for the handle drive system 180. As discussed previously herein, in some embodiments, this additional remaining space that may comprise a handle drive system 180 may be approximately 2 to 5 inches; however, this is not intended to be limiting as this space may be smaller or larger than 2 to 5 inches. This handle drive member 180 may include a motor, solenoid, or the like and may be coupled with the controller 40 to control the transition of the handle between recessed and extended positions. In some embodiments, a cover (e.g. a plastic cover) may be placed over the area to prevent exposure of the mechanical elements.

Figure 10:
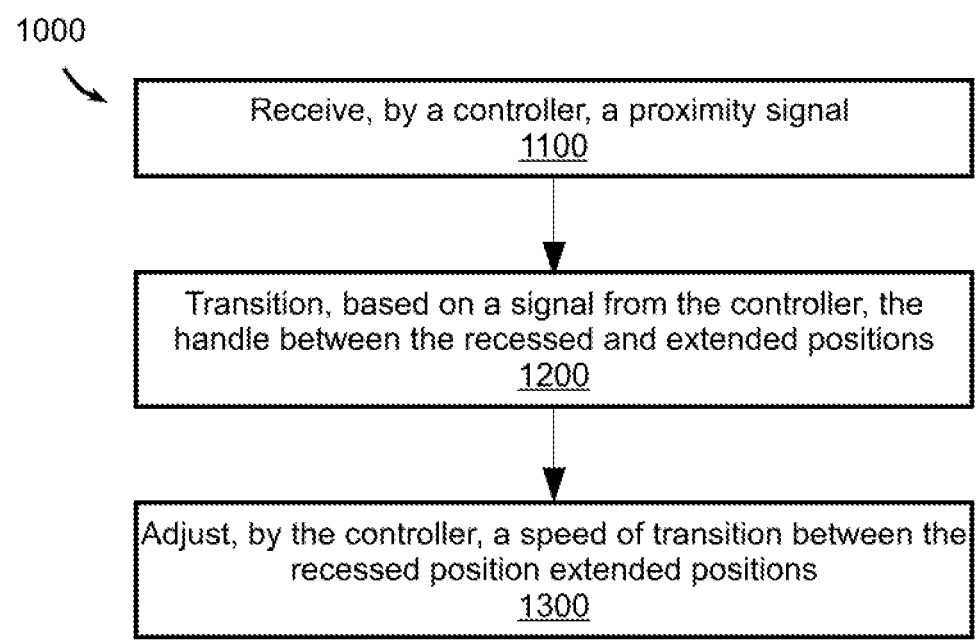
FIG. 10 is a flow chart of an exemplary embodiment of a method of opening a refrigerator.

Referring now to FIG. 10 an exemplary embodiment of a method 1000 of opening a refrigerator 10 is illustrated in a flowchart. The refrigerator 10 may include at least some of the features discussed herein, such as a handle TO attached to a door 18, 20 that is movable between recessed and extended positions and operable in both positions. At block 1100, the controller 40 may receive a proximity signal from the proximity sensor 56. At block 1200, the handle 70 may transition between the recessed and extended positions based on the signal from the controller 40. As discussed previously, the handle drive system 80 may also be in communication with the controller 40, and may mechanically facilitate this transition. In some embodiments, the method 100 may optionally include, at block 1300, the controller 40 adjusting the speed at which the transition between the recessed and extended positions occurs. This adjustment of the transition speed may be based on a user-defined input.

Although primarily described herein with reference to a refrigerator type of appliance, the description herein is not so limited. The transitioning handles and associated components referenced herein may be utilized with other types of household appliances, including but not limited to, washing machines, dryers, dishwashers, ovens, toaster ovens, microwave ovens, or the like.

It will be appreciated that various additional modifications may be made to the embodiments discussed herein, and that a number of the concepts disclosed herein may be used in combination with one another or may be used separately. Therefore, the invention lies in the claims hereinafter appended.

What is claimed is:

1. A refrigerator appliance comprising:
    a housing defining at least a food compartment;
    a door attached to the housing and providing access to the food compartment, the door including an exterior surface and a handle recess extending inwardly from the exterior surface of the door;
    a handle attached to the door and movably mounted within the handle recess between a recessed position and an extended position; and
    a handle drive system coupled to the handle to transition the handle between the recessed position and the extended position,
    wherein the handle is manually grippable in both the recessed position and the extended position,
    wherein the handle recess is sized and configured to provide access to an inwardly facing surface of the handle to facilitate manual gripping of the handle when the handle is in the recessed position, and
    wherein the handle drive system is configured to maintain the handle in the recessed position when the handle is used to open the door while the handle is in the recessed position.

2. The refrigerator appliance of claim 1, wherein the refrigerator appliance further comprises a controller coupled to the handle drive system to transition the handle between the recessed position and the extended position.

3. The refrigerator appliance of claim 2, wherein the refrigerator appliance further comprises a proximity sensor coupled to the controller and configured to sense user presence.

4. The refrigerator appliance of claim 3, wherein the controller is configured to, based on a proximity signal from the proximity sensor, transition the handle to the extended position.

5. The refrigerator appliance of claim 3, wherein the controller is configured to, based on a proximity signal from the proximity sensor, transition the handle to the recessed position.

6. The refrigerator appliance of claim 2, wherein the controller is configured to, based on a user-defined setting, adjust a speed of transition between the recessed position and the extended position.

7. The refrigerator appliance of claim 2, wherein the controller is configured to, based on a user-activated switch, fix the handle in either the recessed position or the extended position.

8. The refrigerator appliance of claim 2, wherein the handle drive system comprises a motor.

9. The refrigerator appliance of claim 2, wherein the handle drive system comprises a solenoid.

10. The refrigerator appliance of claim 2, wherein the handle drive system further comprises a stop that inhibits movement of the handle beyond the extended position.

11. The refrigerator appliance of claim 1, wherein the handle is slidably attached to the door such that movement between the recessed position and the extended position is a linear movement.

12. The refrigerator appliance of claim 1, wherein the handle is pivotably attached to the door such that movement between the recessed position and extended position is a pivot movement.

13. The refrigerator appliance of claim 1, wherein the handle is attached to the door such that movement between the recessed position and the extended position is a combination of a linear movement and a pivot movement.

14. The refrigerator appliance of claim 1, wherein the handle comprises an elongated member supported by one or more transverse support structures that recess into the handle recess.

15. The refrigerator appliance of claim 14, wherein the elongated member is substantially vertically oriented.

16. The refrigerator appliance of claim 14, wherein the elongated member is substantially horizontally oriented.

17. A refrigerator appliance comprising:
    a housing defining at least a food compartment;
    a door attached to the housing and providing access to the food compartment, the door including an exterior surface and a handle recess extending inwardly from the exterior surface of the door;
    a handle attached to the door and movably mounted within the handle recess for movement between a recessed position and an extended position,
    wherein the handle is manually grippable for the purpose of opening the door in both the recessed position and the extended position;
    wherein the handle recess is sized and configured to provide access to an inwardly facing surface of the handle to facilitate manual gripping of the handle when the handle is in the recessed position;
    a handle drive system configured to transition the handle between the recessed position and the extended position, wherein the handle drive system is configured to maintain the handle in the recessed position when the handle is used to open the door while the handle is in the recessed position;
    a proximity sensor that generates a proximity signal; and
    a controller that is configured to, based on the proximity signal, signal the handle drive system to transition the handle between the recessed position and the extended position.

18. A household appliance comprising:
    a housing defining at least one compartment of the appliance;
    a door attached to the housing and providing access to the at least one compartment, the door including an exterior surface and a handle recess extending inwardly from the exterior surface of the door;
    a handle attached to the door and movably mounted within the handle recess between a recessed position and an extended position; and
    a handle drive system coupled to the handle to transition the handle between the recessed position and the extended position, and
    wherein the handle is manually grippable in both the recessed position and the extended position,
    wherein the handle recess is sized and configured to provide access to an inwardly facing surface of the handle to facilitate manual gripping of the handle when the handle is in the recessed position, and wherein the handle drive system is configured to maintain the handle in the recessed position when the handle is used to open the door while the handle is in the recessed position.

19. The appliance of claim 18, wherein the appliance is a washing machine, a dryer, a dishwasher, an oven, a toaster oven, or a microwave oven.

\* \* \* \* \*